United States Patent [19]

Linger

[11] 4,411,322

[45] Oct. 25, 1983

[54] CULTIVATING MACHINE ROTOR

[75] Inventor: Barry A. Linger, Norfolk, England

[73] Assignee: Howard Machinery Limited, Harleston, England

[21] Appl. No.: 266,154

[22] Filed: May 22, 1981

[30] Foreign Application Priority Data

May 29, 1980 [GB] United Kingdom ............... 8017639

[51] Int. Cl.³ .............................................. A01B 33/14
[52] U.S. Cl. ..................................... 172/540; 172/554
[58] Field of Search ............... 172/119, 121, 122, 123, 172/552, 553, 537, 554, 539, 713, 547, 548, 45, 21, 540; 130/27 N, 27 G; 56/400

[56] References Cited

U.S. PATENT DOCUMENTS

| 919,570 | 4/1909 | Grafe | 172/552 X |
| 1,116,011 | 11/1914 | Carpenter | 172/119 X |
| 3,532,171 | 10/1970 | Kasten | 172/713 X |

FOREIGN PATENT DOCUMENTS

| 6803684 | 9/1969 | Netherlands | 172/554 |
| 1378382 | 10/1971 | United Kingdom . | |
| 1464715 | 3/1973 | United Kingdom . | |

Primary Examiner—Richard J. Johnson
Attorney, Agent, or Firm—Wood, Dalton, Phillips, Mason & Rowe

[57] ABSTRACT

A rotor and cultivating tools are provided for a rotary cultivating machine. The rotor is of the kind having a plurality of outwardly directed cultivating tools, in the form of rods.

To fix the tools to the rotor shaft the shaft has secured to it one or more helical bars extending around the shaft from one end to the other. Holes are formed in the bars and in the shaft to receive the cultivating tools.

The tools have a working portion at one end and a shank at the other end. The shank extends through the bar and the shaft and is secured by a nut at the end opposite the working portion. The working portion is flattened at its outer end to present a narrower dimension to the ground being worked.

The arrangement provides a shaft and tools which are cheaper to make and replace.

6 Claims, 3 Drawing Figures

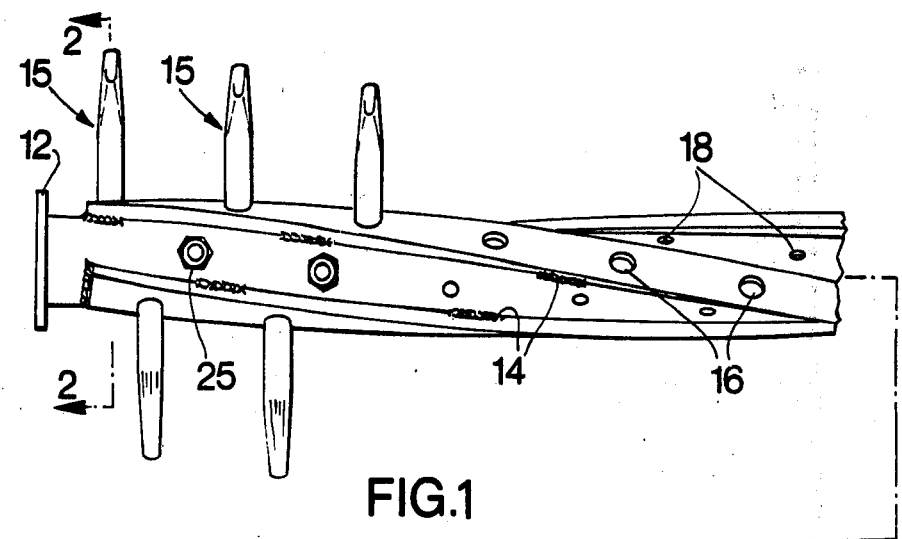
FIG.1
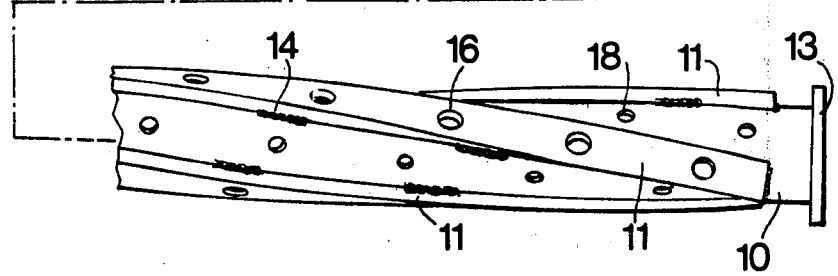
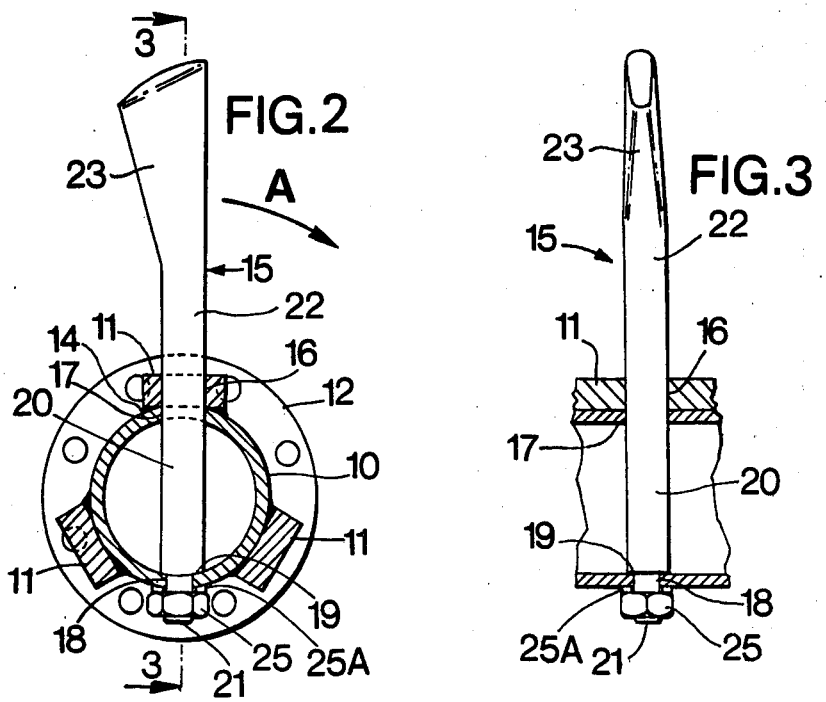
FIG.2
FIG.3

CULTIVATING MACHINE ROTOR

This invention relates to a rotor for a cultivating machine and in particular to a rotor for carrying a plurality of replaceable cultivating tools.

Cultivating machines having a driven horizontal rotor transverse to the direction of travel have been fitted with a variety of cultivating tools. More recently rod-shaped outwardly directed tools have become popular. Various proposals have been made for connecting these tools releasably to the rotor in a manner which is cost effective and efficient having regard to the duty the tools have to perform and the need to be able to fit and release the tools easily.

In prior British Patent Specification Nos. 1,378,382 and 1,464,715 there are proposed rod-shaped tools which are double-ended and fitted through the rotor shaft. Such tools are held in place by nuts engaging screw threaded portions of the tool or by a pin or bolt located through a block mounted on the shaft and engaging a groove in the tool. In other cases flanges have been fitted along the shaft and the tools mounted on the flanges in a similar manner to that adopted with bladed rotary cultivators.

In each of these prior arrangements disadvantages have arisen. For example costly materials may have to be used to form the tools, the tools may be subject to bending and breakages, and the tools may be difficult and time consuming to fit and remove. With flange-mounted tools, in particular, the rotor shaft with the flanges attached thereto is relatively costly to produce and there may have to be provided a variety of tool shapes in order to effectively cultivate over the entire length of the shaft.

An object of the invention is to overcome at least some of these disadvantages by providing an improved rotor for a cultivating machine and cultivating tools arranged to be releasably securable to the rotor.

According to the invention a cultivating machine rotor comprises a shaft of circular cross-section, and at least one fixing element secured to the external surface of the shaft and having a bore aligned with a bore in the shaft so that the shank of a cultivating tool can be received in the bores to extend through the element and the shaft for the tool to protrude to each side of the shaft, wherein the fixing element is an elongate bar extending helically around and along the shaft and having a plurality of bores spaced along its length with each bore aligned with a bore in the shaft to receive a cultivating tool.

Preferably the bores for each tool are aligned along a radius passing through the axis of rotation of the shaft. At one protruding end of the tool is formed a screw-threaded portion about which is located a nut to hold the tool on the shaft. The other protruding end of the tool constitutes a working portion of the tool and conveniently extends radially outwards of the shaft.

Preferably three bar members are located around a tubular shaft equally spaced from one another about the axis of the shaft so that each tool passes through a bar member and through first and second bores provided in the portions of the shaft lying directly under and opposite the bar member respectively.

Preferably the first bore and the complimentary bore in the bar member are of the same size and are of larger diameter than said second bore. The threaded end portion of each tool may be of a size to pass through the second bore while the portion of the tool adjacent said threaded end is of the diameter of the first bore so as to provide a shoulder which abuts against the inside wall of the shaft around said second bore.

The rotor construction not only provides a secure fixing for the tools with ready replacement of the tools but the rotor shaft is of sufficient strength and rigidity that the shaft diameter can be reduced compared with prior arrangements not including a helical bar.

The invention also provides a cultivating tool for use with the cultivating machine rotor of the invention, the tool comprising an elongate member having a shank portion to be releasably attached to the shaft and a working portion to extend from one end of the shank portion and outwardly of the shaft, wherein the shank portion is threaded at its end remote from the working portion to receive a fixing nut, the threaded end being of reduced cross-section compared with that of the working portion.

Preferably at least the outer end of the working portion is shaped to present a reduced dimension in a direction at a right angle to its direction of movement through the ground compared with its dimension in said direction of movement.

With a cultivating tool of the invention the material used can be substantially less costly and more easily worked than for other elongate cultivating tools.

Further features of the invention will appear from the following description of an embodiment of the invention given by way of example only and with reference to the drawings in which:

FIG. 1 is a side elevation of a cultivating machine rotor shaft,

FIG. 2 is a cross-section along line 2—2 in FIG. 1 to an enlarged scale, showing a cultivating tool, and FIG. 3 is a cross-section on the line 3—3 in FIG. 2.

Referring to the drawings a shaft for a cultivating machine has a cylindrical tube 10 around which are fixed three rectangular bars 11. The bars 11 are welded at 14 to the shaft 10 along helical paths; in the illustrated embodiment each bar passing through about 360° about the shaft axis over a length of about 3 meters.

The shaft has a mounting flange 12, 13 at each end for fitting the shaft into a cultivating machine of the kind having a frame (not shown) rotatably supporting the ends of the shaft and with drive means for transmitting drive to one or both ends of the shaft. The frame is mounted on the three point linkage of a tractor and the drive is transmitted from the tractor power take-off shaft to transmission means carried by the frame. In use the shaft extends with its axis horizontal and transverse to the direction of travel of the machine over the ground. However the shaft may find application on other machines.

The shaft is arranged to carry a plurality of cultivating tools 15 (see in particular FIGS. 2 and 3). To receive the cultivating tools regularly spaced along the helical bars 11 the bars are formed with longitudinally and equally spaced bores 16 which lie immediately over bores 17 of the same diameter formed in the wall of the tube 10. In the tube 10 opposite the bores 16 and 17 are formed further bores 18 of smaller diameter than the bores 16 and 17. It will be seen that the positioning of the sets of bores 16, 17 and 18 along the shaft is selected so that the tools 15 are regularly spaced axially of the shaft.

The tools 15 in each bar 11 lie along the helical path of the associated bar and are regularly spaced in the axial direction of the shaft from tools of the other bars. Thus during use the tools act on axially spaced strips of ground to cultivate the ground across the width of the rotor.

Each set of bores 16, 17 and 18 receives a cultivating tool 15 having a shank portion 20 which is located through the bores and has at one end a reduced-section threaded portion 21 having substantially the same diameter as the bores 18. The remainder of the shank portion 20 is of substantially the same diameter as the bores 16 and 17 to define a shoulder 19 adjacent the portion 21. A working portion 22 of the tool 15 extends radially outwards of the shaft and is formed towards its outer end with a flattened portion 23. The portion 23 is located, as shown in FIGS. 2 and 3, with regard to the direction of rotation A of the shaft so that its larger dimension is parallel to the direction of rotation. The shaping of portion 23 gives greater effectiveness in working the ground and longer life as the material wears away from the leading side of the tool.

The tool 15 is held in position on the shaft by a nut 25 and washer 25A which locates onto the threaded end 21 of the tool. The tool is fitted to the shaft simply by inserting the threaded end through the bores 16, 17 and 18 in turn until the shoulder 19 engages the inner wall of the tube 10 and by locating the washer 25A and screwing the nut 25 onto the end 21 of the tool. Release of the tool is by the reverse procedure.

To avoid any tendency of the tools 15 turning about their axes during use the shoulder 19 of each tool is shaped to conform to the shape of the inner surface of the shaft wall which is engaged by the shoulder. In addition the washer 25A may be similarly shaped at one side to conform to the shape of the outer surface of the wall of the shaft which is engaged by the washer 25A. As a further possibility the threaded end 21 of the tool may be formed with a flat extending axially and cooperating with a corresponding flat formed on the hole 18 through which the end 21 passes.

The axial spacing of the tools along the shaft is selected according to the duty of the rotor but a typical spacing is about 5 cms. between centres for a tube of about 110 cms. outside diameter.

The tools are preferably of spring steel heat treated to give a relatively high tons/sq. cm. Thus the tool is of less costly material than some prior tools. In addition the tool reduces the power requirement of the machine without reducing the work performed on the ground. More wear can be obtained out of the tools and they are relatively easier to fit and replace.

The shaft is stronger than comparable shafts without the helical bars so that a smaller diameter tube can be used with a thinner wall thickness.

It will be appreciated that instead of being directed radially the working portion of the tool can be directed in a trailing or leading direction with respect to the direction of rotation. Moreover the working portion 15 can be cranked towards one or other end of the shaft 10 with respect to the shank 20.

What I claim as my invention and desire to secure by Letters Patent of the United States is:

1. A cultivating machine rotor comprising: a cylindrical wall forming a hollow rotary shaft of circular cross section; a fixing element consisting of a bar wrapped helically around and along the exterior of the shaft and secured to the shaft along its length; bores in and spaced along the fixing element; a first bore and a second bore in said cylindrical wall, each of said first and second bores being aligned with a bore in the fixing element and lying on opposite sides of the shaft; cultivating tools each with a shank arranged to be received in the aligned bores of the fixing element and the shaft so that the shank extends through the fixing element and bores radially of the shaft from one side of the shaft to the other and has an end portion protruding from said other side, and a working portion of each tool extending from the shank outwardly of the fixing element so the tools lie in a helical arrangement around the shaft; and securing means for each cultivating tool engageable with the aforesaid end portion of the shank.

2. A rotor according to claim 1 wherein the helical fixing element passes through greater than 180° about the shaft axis in extending from one end of the shaft to the other.

3. A rotor according to claim 1 which has three fixing elements equally spaced from one another about the shaft.

4. A rotor according to claim 1 wherein said end portion of the shank is threaded and the securing means is a threaded nut engaging with said threaded end portion of the shank.

5. A rotor according to claim 4 wherein the first bore in the shaft lies directly under an associated bore in the fixing element and the second bore in the shaft is of smaller size than said first bore and the bore in the fixing element.

6. A rotor according to claim 5 wherein the shank portion of the tool is formed with a shoulder adjacent the threaded end which shoulder engages the inner surface of the cylindrical wall around the second bore.

* * * * *